United States Patent [19]

Csapo et al.

[11] Patent Number: 4,744,079
[45] Date of Patent: May 10, 1988

[54] DATA PACKET MULTIPLEXER/DEMULTIPLEXER

[75] Inventors: John Csapo, Glenview; Gary L. Schlechte, Naperville; Victor F. Williams, Oak Park, all of Ill.

[73] Assignee: GTE Communication Systems Corporation, Phoenix, Ariz.

[21] Appl. No.: 913,923

[22] Filed: Oct. 1, 1986

[51] Int. Cl.$^4$ ............................. H04J 3/24; H04J 3/04
[52] U.S. Cl. ..................................... 370/94; 370/112
[58] Field of Search ............... 370/60, 94, 85, 112; 328/104, 105; 307/242, 243; 375/25; 455/67; 358/11

[56] References Cited

U.S. PATENT DOCUMENTS

| 4,143,246 | 3/1979 | Smith | 370/112 |
| 4,603,416 | 7/1986 | Servel et al. | 370/60 |
| 4,638,474 | 1/1987 | Chalet | 370/60 |

Primary Examiner—Douglas W. Olms
Assistant Examiner—Frank M. Scutch, III
Attorney, Agent, or Firm—Gregory G. Hendricks

[57] ABSTRACT

A Multiplexer/Demultiplexer for transmitting packetized data between a processor and a Pulse Code Modulation (PCM) bus. First-in First-Out (FIFO) shift registers, serial-to-parallel and parallel-to-serial converters and associated timing and control circuits are utilized to perform the packetized data transmission.

8 Claims, 3 Drawing Sheets

DATA PACKET MULTIPLEXER/DEMULTIPLEXER

BACKGROUND OF THE INVENTION

Conversion of serial to parallel and parallel to serial data is well known in pulse code modulation (PCM) systems, a typical example of such a conversion circuit is the well know coder/decoder (CODEC). However, the CODEC can not implement a packetized data transmission system.

Accordingly, it is the object of the present invention to provide an arrangement for transmission of packetized data between a serial PCM bus and a processor.

DESCRIPTION OF THE PREFERRED EMBODIMENT

The Packet Data Multiplexer/Demultiplexer of the present invention converts 8-bit parallel data from a processor into a serial PCM bit stream and transmits that serial bit stream to a PCM bus. Similarly this multiplexer/demultiplexer receives PCM serial bit streams from the PCM bus, and converts such serial data to 8-bit parallel minipackets which are then made available to the processor. The serial bit timing is fixed by an external bit clock which has a nominal frequency of 1.544 MHz.

The received and transmitted data are organized as minipackets with each minipacket being eight bytes in length. The processor reads and writes data in such minipacket groups.

A space available signal is used to inform the processor that a transmit buffer has room for eight data bits to be transmitted to the PCM bus. After one of the 24 time slots on the PCM bus is selected nine bytes of data are output in the next nine such time slots. The first byte is a header or start byte coded as "7E" hexadecimal and the next eight bytes are data bytes which are stored in transmit buffer. If the transmit buffer does not contain a complete 8-byte minipacket, a null pattern "00" hexadecimal is transmitted during each associated PCM time slot.

When serial data is to be received, the PCM bus is monitored for time slots containing a start byte. Such monitoring of the PCM bus is referred to as the "hunt" mode of operation. When a start byte is detected the next eight serial data time slot bytes are loaded into a receive buffer. A minipacket available signal is used to inform the processor that a minipacket is available to be read from the multiplexer/Demultiplexer.

Figure 1:
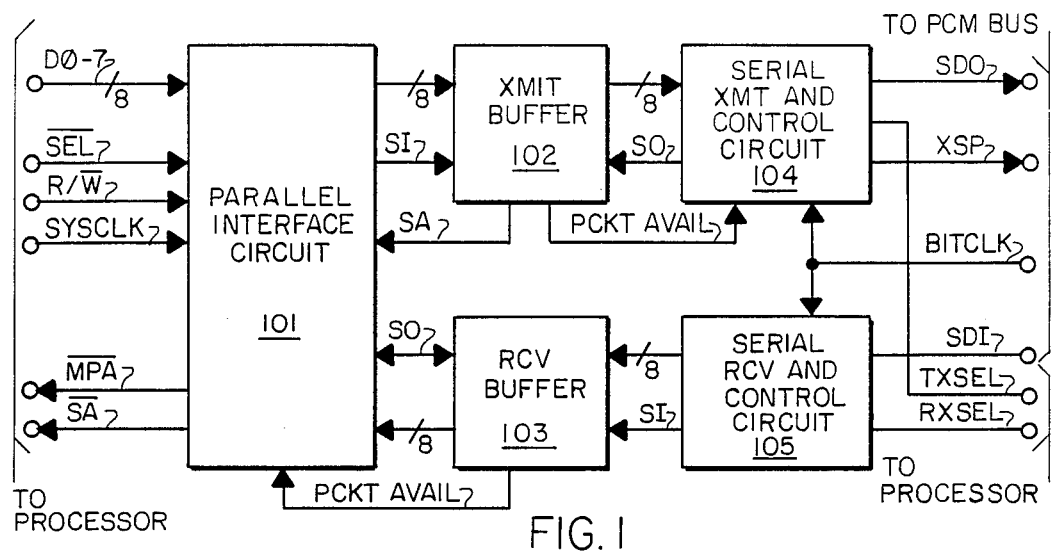
FIG. 1 of the accompanying drawing is a block diagram of the Data Packet Multiplexer/Demultiplexer of the present invention.

Referring now to FIG. 1 the Packet Data Multiplexer/Demultiplexer of the present invention is shown connectable between a processor and a PCM bus.

Parallel Interface circuit 101 is arranged for connection to the processor and also to transmit buffer 102 and receive buffer 103. Also, serial transmit and control circuit 104 is connected between transmit buffer 102 and the PCM bus and serial receive and control circuit 105 is connected between receive buffer 103 and the PCM bus.

Parallel interface circuit 101 transmits and receives data to and from the processor on leads data o (DO)-data 7 (D7), when enabled by a logic level o signal on the select (SEL) lead and a clock pulse on the system clock (SYS CLK) lead. Signals on the read/write (R/W) determine the direction of data flow depending on whether data is being read from or written into the parallel interface circuit. This circuit also provides for the latching of input data, the gating of output data and it generates the proper strobing signals to allow data to be removed or queued.

Transmit buffer 102 and receive buffer 103 perform identical functions but they transmit data in different direction. Transmit buffer 102 takes data from parallel interface circuit 101 and transmits it to serial transmit and control circuit 104. Receive buffer 103 receives data from serial receive and control circuit 105 and transmits it to parallel interface circuit 101. Both the transmit and receive buffers are 16 bytes deep. On each buffer, a space available (SA) and/or packet available (PCKT Avail) signal is generated when the 8 byte buffers are empty or full, respectively.

Serial transmit and control circuit 104 converts parallel data to a serial PCM bit stream, provides bit and packet timing or clock pulses, and generates null and header bytes which are multiplexed into the bit stream.

Serial receive and control circuit 105 converts serial PCM bit stream data into 8-bit parallel data, provides bit and packet timing or clock pulses and detects the header byte in received data.

Figure 2:
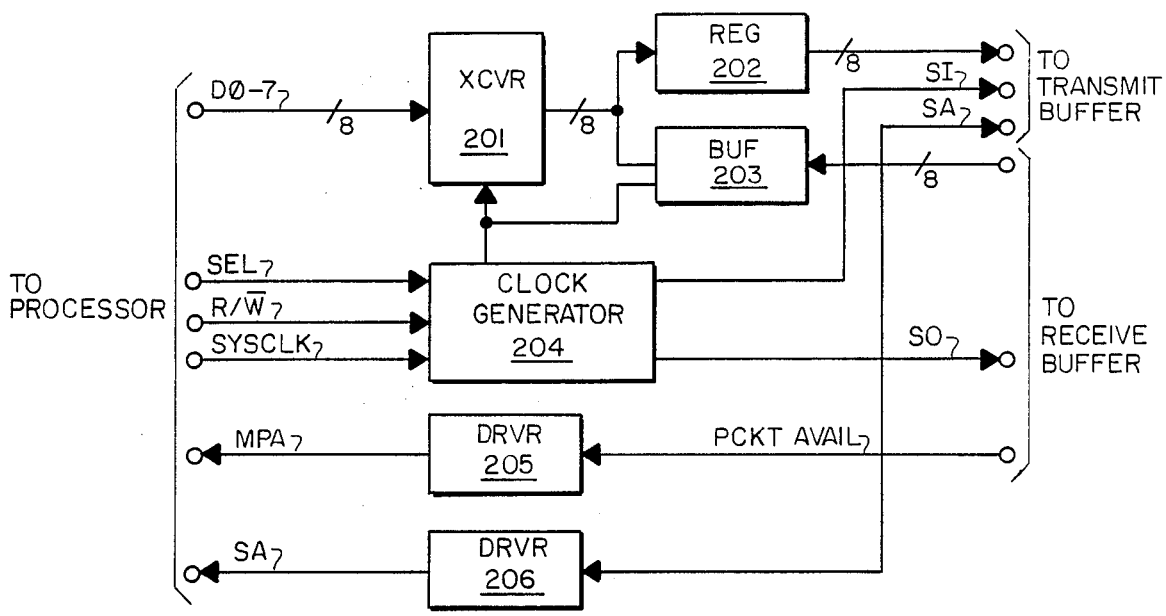
FIG. 2 of the accompanying drawing is a block diagram of the parallel interface of FIG. 1.

Referring now to FIG. 2, a block diagram of the parallel interface circuit of FIG. 1 is shown. Transceiver 201 transmits processor data to the transmit buffer via register 202 and transmits receive buffer data to the processor via tri-state buffer 203 when the SEL and SYS CLK signals are true. The SEL signal enables the parallel interface circuit for parallel bus transactions and the SYS CLK signals synchronize bus transactions to the processor and provide an internal operating clock. The direction of the data flow is determined by the state of the R/W signal. Read and Write operations are performed when this signal is a logic level 1 and 0, respectively. Clock generator 204 responds to the logic level 1 and 0 R/W signals by applying shift out (SO) and shift in (SI) signals to the receive and transmit buffer respectively. When PCKT AVAIL and SA signals appear at the receive and transmit buffers drivers 205 and 206 apply minipacket available (MPA) and space available (SA) signals to the processor, respectively. The MDA signal indicates that an 8-byte minipacket of data in the receive buffer is available for reading by the processor. The SA signal indicates that there is space in the transmit buffer for an 8-byte minipacket of data.

Figure 3:
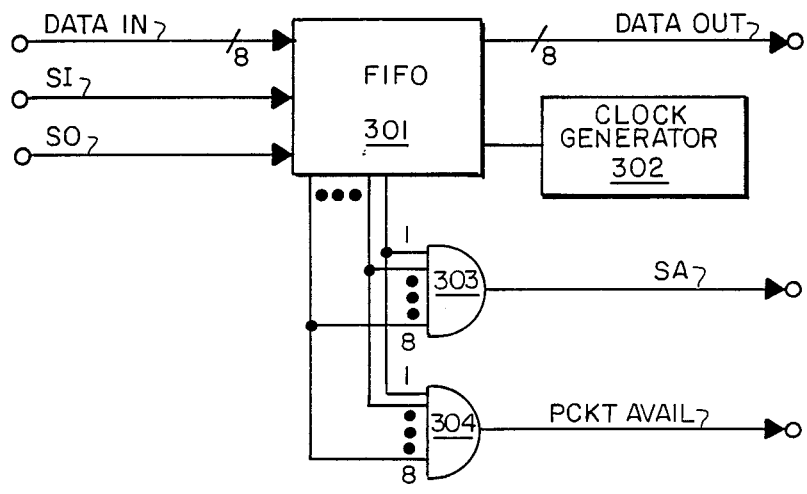
FIG. 3 of the accompanying drawing is a block diagram of the transmit and receive buffers of FIG. 1.

Referring now to FIG. 3, a packet buffer, used to implement the send and receive buffers, is shown.

First-In-First-Out (FIFO) shift register 301 is connected between the parallel interface circuit and the appropriate serial transmit or receive and control circuit. Clock generator 302 provides the necessary clock signals for FIFO 301 to shift data. And gates 303 and 304 are connected to the appropriate parallel interface circuit, or serial transmit or receive and control circuit.

FIFO 301 stores data appearing on the DATA IN leads when the SI signal is true. Similarly FIFO 301 makes stored data available on the DATA OUT leads when the SO signal is true. And gate 303 provides the SA signal when a status bit associated with each of eight bytes is false thereby indicating that space is available for an 8-byte minipacket of data. Similarly gate 304 provides the PCKT AVAIL signal when eight such status bits are true thereby indicating that an 8-byte minipacket of data is available for reading.

Figure 4:
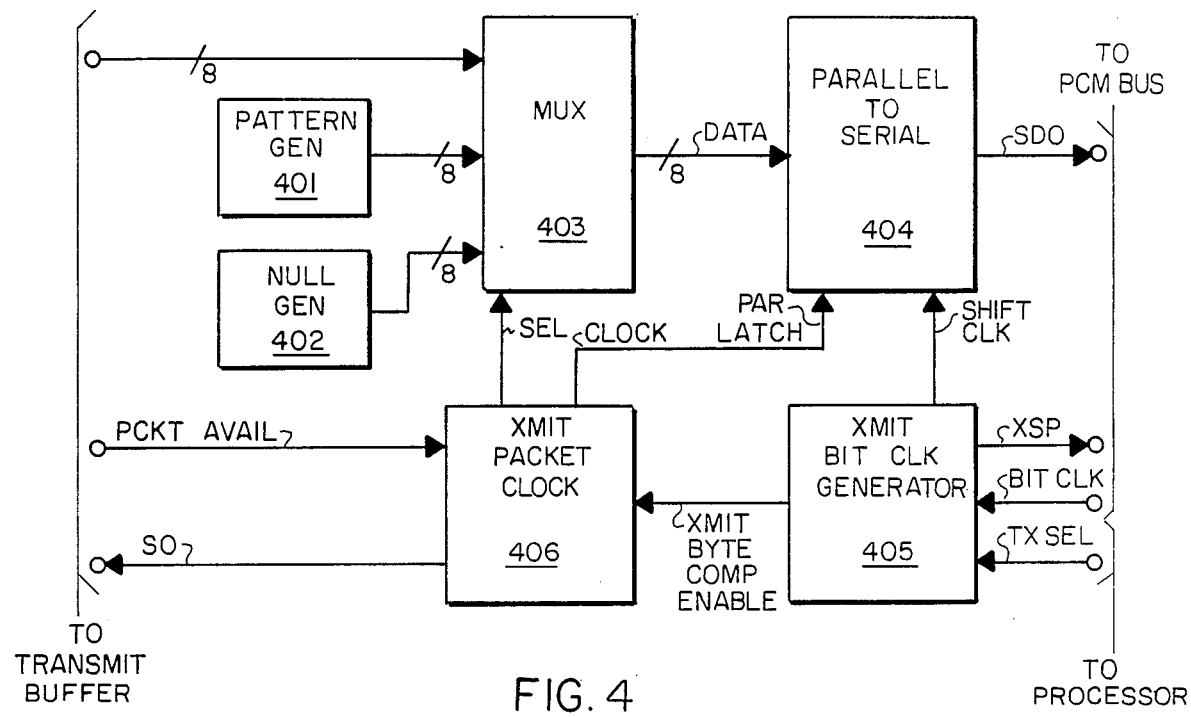
FIG. 4 of the accompanying drawing is a block diagram of the serial transmit and control circuit of FIG. 1.

Referring now to FIG. 4 a block diagram of the serial transmit and control circuit is shown.

Pattern generator 401 and null generator 402 are connected to multiplex 403 which is also connected to the transmit buffer, parallel to serial converter 404 and transmit packet clock generator 406. Parallel to serial converter 404 is further connected to the PCM bus transmit packet clock generator 406 and transmit bit clock generator 405. Transmit packet clock generator 406 is further connected to the transmit buffer and transmit bit clock generator 405 which is further connected to the PCM bus and the processor.

Pattern generator 401 contains the "start" pattern "7E" hexadecimal and null generator 402 contains pattern "00". Multiplexer 403, based on the value of the select (SEL) signal from transmit packet clock generator 406 applies the start pattern, the null pattern or transmit buffer data to parallel to serial converter 404.

Parallel to serial converter 404 latches the data received from multiplexer 403 and shifts it out in a serial bit stream when the proper control signals parallel latch clock (PAR) and SHIFT CLOCK are received from transmit packet clock generator 406 and transmit bit clock generator 405, respectively. The shift clock signals control the shifting of the bit stream on to the PCM bus and the PAR latch clock controls the receipt of the 8-bit parallel data from multiplexer 403. Transmit bit clock generator 405 generates the signals necessary to shift data out of parallel to serial converter 404, i.e., SHIFT CLK, and a signal representing transmission of a complete byte, i.e., XMIT BYTE COMP, to transmit packet clock generator 406.

The transmit select (TXSEL) signal is used to enable the transmission of an output frame of data to the PCM bus and the BIT CLK signal, nominally a 1.544 MHz clock signal is used to synchronize PCM transactions. The transmit slot pulse (XSP) is normally high but this signal goes low for 8 clock pulses when parallel to serial converter 404 is transmitting an 8-bit frame of data to the PCM bus. Such data appears on the serial data out (SDO) lead on each SHIFT CLK pulse when TXSEL is true.

Transmit packet clock generator 406 sequences the packet transmit operation. When there is no packet available in the transmit buffer, a null select (SEL) signal is applied to multiplexer 403 to cause it to gate the signals from null generator 402. When a packet becomes available for transmission, pattern generator 401 is enabled by the SEL signal to cause the "start" pattern to be selected for the next byte to be transmitted, followed by eight bytes of data from the transmit buffer for succeeding bytes.

Figure 6:
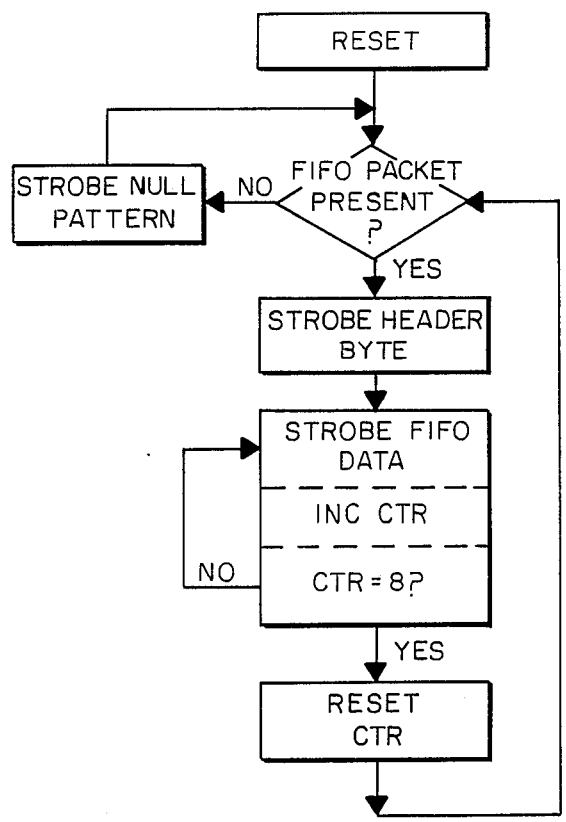
FIG. 6 of the accompanying drawing is a flow chart of the serial transmit and control function.

Transmit Packet clock generator 406, in response to the packet available (PCKT AVAIL) from the transmit buffer, generates the signal shift out (SO) to cause the transmit buffer to shift data to multiplexer 403 and the signal PAR LATCH CLOCK to cause parallel to serial converter 404 to latch data selected by multiplexer 403. The sequence of operations performed by the serial transmit and control circuit is shown in FIG. 6.

Figure 5:
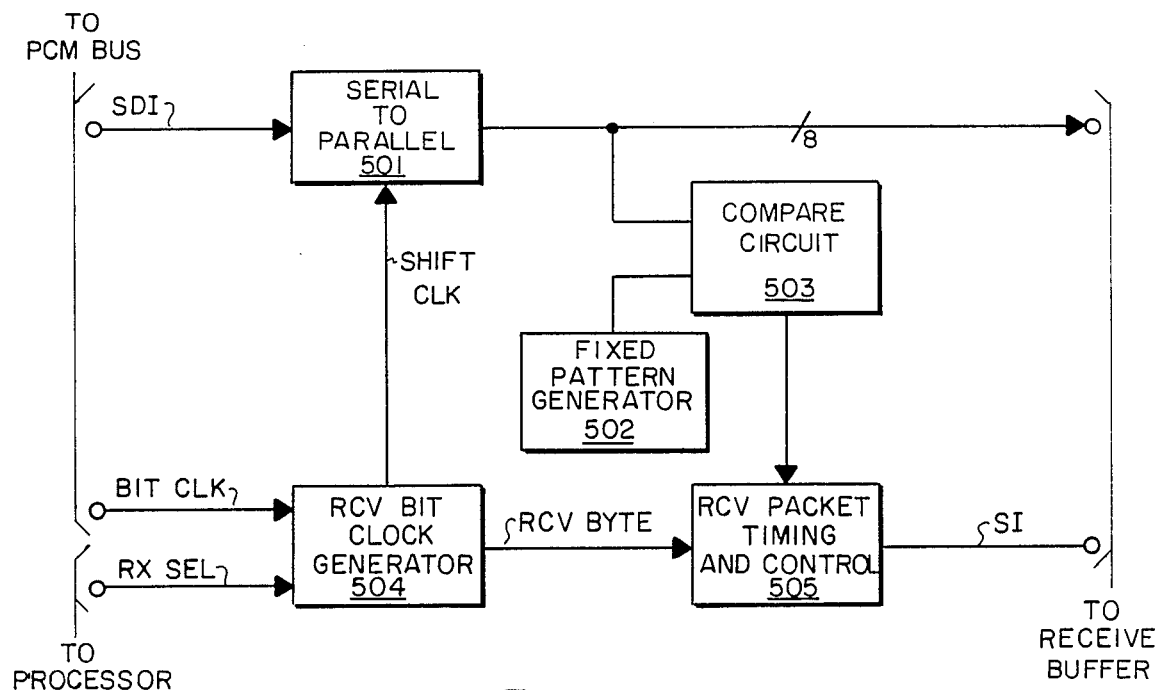
FIG. 5 of the accompanying drawing is a block diagram of the serial receive and control circuit of FIG. 1.

Referring now to FIG. 5 the serial receive and control circuit is shown. Serial to parallel converter 501 is connected to the PCM bus, receive bit clock generator 504, comparator circuit 503 and the receive buffer. Receive bit clock generator 504 is further connected to the PCM bus, the processor and receiver packet clock generator 505 which is also connected to the receive buffer. Comparator circuit 503 is further connected to fixed pattern generator 502 and receive packet clock generator 505.

Serial to parallel converter 501 converts the serial data received from the PCM bus to parallel data which is applied to the receive buffer.

Receive bit clock generator 504 generates the clock signal (SHIFT CLK) necessary to cause serial to parallel converter 501 to shift serial data into itself for conversion to parallel data. Receive bit clock generator 504 also generates a receive (RCV) byte signal which is applied to receive packet clock generator 505 when a complete byte has been received and converted by serial to parallel converter 501.

Figure 7:
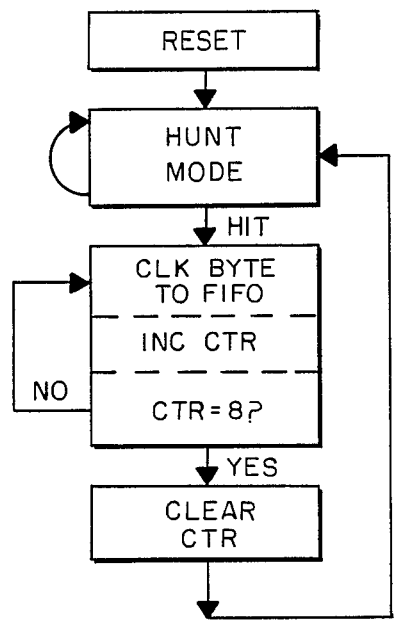
FIG. 7 of the accompanying drawing is a flow chart of the receive and control function.

Receive packet clock generator 505 sequences the packet receive operation. When the receive (RCV) byte signal is received from the receive bit clock generator, comparator circuit 503 compares data converted by serial to parallel converter 501 to the fixed start pattern "7E" hexadecimal. This "hunt" mode is continued until the converted data matches the start pattern. Such a comparison indicates that a minipacket of data is being received and that the next eight bytes of converted data are to be loaded into the receive buffer. After these eight bytes of data are transferred to the receive buffer, this "hunt" mode is re-entered. The sequence of operations performed by the serial receive and control circuit is shown in FIG. 7.

What is claimed is:

1. A data packet multiplexer/demultiplexer for use in a system including a processor and a pulse code modulation (PCM) bus, said processor being operated to send and receive parallel output and input data, respectively, and said PCM bus being operated to transmit and receive serial input and output data, respectively, said data packet multiplexer/demultiplexer comprising:

parallel interface means connected to said processor and operated in response to said parallel output data from said processor to provide stored parallel output data;

buffer means connected to said parallel interface means and operated to store a predetermined quantity of said stored parallel output data and provide a corresponding predetermined quantity of parallel output buffer data and an associated output packet available signal; and serial interface means connected between said buffer means and said PCM bus, and operated in response to said output packet available signal to retrieve said predetermined quantity of parallel output buffer data, convert it to a corresponding predetermined quantity of serial output data and transmit said predetermined quantity of serial output data to said PCM bus;

said serial interface means being further operated in response to said serial input data to convert it to parallel input buffer data;

said buffer means being further operated to store a predetermined quantity of said parallel input buffer data and provide a corresponding predetermined quantity of stored parallel input data and an associated input packet available signal;

said parallel interface means being further operated in response to said input packet available signal to retrieve said predetermined quantity of stored parallel input data and provide a corresponding predetermined quantity of said parallel input data.

2. A data packet multiplexer/demultiplexer as claimed in claim 1, wherein said parallel interface means comprises a transceiver connected to an output register and an input buffer.

3. A data packet multiplexer/demultiplexer as claimed in claim 1, wherein said buffer means comprises an output buffer and an input buffer.

4. A data packet multiplexer/demultiplexer as claimed in claim 3, wherein said input and output buffers each comprise a first-in-first-out shift register.

5. A data packet multiplexer/demultiplexer as claimed in claim 1, wherein said serial interface means comprises a serial transmit circuit and a serial receive circuit.

6. A data packet multiplexer/demultiplexer as claimed in claim 5, wherein said serial transmit circuit comprises a parallel to serial converter.

7. A data packet multiplexer/demultiplexer as claimed in claim 6, wherein said serial transmit circuit further comprises a pattern generator operated to provide a predetermined data pattern and a multiplexer connected to said pattern generator and said buffer means and operated to merge said predetermined data pattern with said parallel output buffer data.

8. A data packet multiplexer/demultiplexer as claimed in claim 5, wherein said serial receive circuit comprises a serial to parallel converter.

* * * * *